(12) United States Patent
Xie et al.

(10) Patent No.: US 9,528,869 B2
(45) Date of Patent: Dec. 27, 2016

(54) METHOD OF COMPENSATING FOR CHANGES IN WATER PROPERTIES IN A MULTIPHASE FLOW METER

(71) Applicant: Schlumberger Technology Corporation, Sugar land, TX (US)

(72) Inventors: Cheng-Gang Xie, Singapore (SG); Paul Simon Hammond, Bourn (GB); Ian Atkinson, Cambs (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/571,295

(22) Filed: Dec. 16, 2014

(65) Prior Publication Data

US 2016/0169726 A1    Jun. 16, 2016

(51) Int. Cl.
*G01F 1/74* (2006.01)
*G01N 22/00* (2006.01)
(Continued)

(52) U.S. Cl.
CPC .............. *G01F 15/02* (2013.01); *E21B 49/087* (2013.01); *G01F 1/74* (2013.01)

(58) Field of Classification Search
CPC .................................. G01N 22/00; G01F 1/74
See application file for complete search history.

(56) References Cited

U.S. PATENT DOCUMENTS

| | | | | |
|---|---|---|---|---|
| 3,891,391 A | * | 6/1975 | Boone ...................... | G01F 1/696 73/204.18 |
| 5,485,743 A | * | 1/1996 | Taherian ................. | G01N 22/00 324/637 |

(Continued)

FOREIGN PATENT DOCUMENTS

| | | |
|---|---|---|
| EP | 0492743 | 3/1995 |
| EP | 0494842 | 4/1998 |
| GB | 2376074 | 12/2002 |

OTHER PUBLICATIONS

G.C. Malmberg, A.A. Maryott, "Dielectric constant of water from 0 to 100oC", J. Research National Bureau of Standards, vol. 56, No. 1, Jan. 1956, RP2641.

(Continued)

*Primary Examiner* — David Porta
*Assistant Examiner* — Faye Boosalis
(74) *Attorney, Agent, or Firm* — Cameron R. Sneddon

(57) ABSTRACT

A method for compensating for changes in a property of water in a multiphase fluid during analysis of the multiphase fluid is provided. In one embodiment, the method includes providing a multiphase flow meter system configured to emit and detect nuclear radiation, to emit and detect microwave radiation, and to analyze a received multiphase fluid. The method can also include measuring a temperature and a microwave complex permittivity of the multiphase fluid. Further, the method includes compensating for changes in the property of water in the multiphase fluid during analysis of the multiphase fluid by using an empirical transformation between the fluid temperatures, microwave complex permittivities and nuclear mass attenuation coefficients for mixtures of different waters expected to be produced and received by the multiphase flow meter system. Additional systems, devices, and methods are also disclosed.

20 Claims, 5 Drawing Sheets

(51) Int. Cl.
    *G01F 15/02*     (2006.01)
    *E21B 49/08*     (2006.01)

(56) References Cited

U.S. PATENT DOCUMENTS

| | | | |
|---|---|---|---|
| 5,793,216 A * | 8/1998 | Constant | ................ G01F 1/663 |
| | | | 324/639 |
| 6,831,470 B2 | 12/2004 | Xie et al. | |
| 7,469,188 B2 * | 12/2008 | Wee | ......................... G01F 1/58 |
| | | | 702/100 |
| 7,908,930 B2 | 3/2011 | Xie et al. | |
| 8,536,883 B2 | 9/2013 | Xie et al. | |
| 2013/0327154 A1 | 12/2013 | Xie et al. | |

OTHER PUBLICATIONS

O.L. Bo, E Nyfors, "Application of microwave spectroscopy for the detection of water fraction and water salinity in water/oil/gas pipe flow" Journal of Non-Crystalline Solids 305 (2002) pp. 345-353.
Pinguet et al., A Step Change in the Liquid Detection and Redundancy Measurement in Wet Gas Subsea Business, The Americas Flow Measurement Conference, May 1-2, 2013. (20 pages).

\* cited by examiner

METHOD OF COMPENSATING FOR CHANGES IN WATER PROPERTIES IN A MULTIPHASE FLOW METER

BACKGROUND

Wells are generally drilled into subsurface rocks to access fluids, such as hydrocarbons, stored in subterranean formations. The subterranean fluids can be produced from these wells through known techniques. Operators may want to know certain characteristics of produced fluids to facilitate efficient and economic exploration and production. For example, operators may want to know flow rates of produced fluids. These produced fluids are often multiphase fluids (e.g., those having some combination of water, oil, and gas), making measurement of the flow rates more complex.

Various systems can be used to determine flow rates for multiphase fluids. In some systems, multiphase fluids are separated into their constituent phases and these phases are then individually tested to determine flow rates. Other systems include multiphase flow meters that can be used to measure flow rates of multiphase fluids without separation. These multiphase flow meters may be smaller and lighter than traditional separators and test units, and the ability to measure flow rates without separation may be desirable in some instances. Both the traditional separator systems and the multiphase flow meter systems can also be used to determine certain other fluid characteristics of interest.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In one embodiment of the present disclosure, a method includes providing a multiphase flow meter system that can emit and detect nuclear radiation, emit and detect microwave radiation, and analyze a received multiphase fluid. The method also includes measuring a temperature of the multiphase fluid, measuring a microwave complex permittivity of the multiphase fluid, and compensating for changes in a property of water in the multiphase fluid during analysis of the multiphase fluid by the multiphase flow meter system. An empirical transformation between the fluid temperature, microwave complex permittivity and a nuclear mass attenuation coefficient for water received by the multiphase flow meter system can be used for this compensation.

In another embodiment of the present disclosure, an apparatus includes a conduit coupled to a multiphase flow meter and a microwave sensor unit coupled to the conduit. The apparatus further includes an analysis system that can determine a characteristic of the multiphase fluid. The analysis system can also compensate for changes in a property of water in the multiphase fluid by determining values for nuclear mass attenuation coefficients for water used to determine the characteristic based on complex permittivities measured with the microwave sensor and stored data representing empirical correlations between microwave sensor measurements and nuclear attenuation coefficients.

In an additional embodiment, a method includes providing, at different times, multiple waters with different salinities in a measurement section of a multiphase flow meter. Further, the method includes determining a microwave complex permittivity and a nuclear mass attenuation coefficient for each of the multiple waters. Correlations between the determined microwave complex permittivities and the determined nuclear mass attenuation coefficients can be stored in a memory to facilitate use of the stored correlations to compensate in real time for changes in salinity of water in a multiphase fluid during analysis of the multiphase fluid.

Various refinements of the features noted above may exist in relation to various aspects of the present embodiments. Further features may also be incorporated in these various aspects as well. These refinements and additional features may exist individually or in any combination. For instance, various features discussed below in relation to the illustrated embodiments may be incorporated into any of the above-described aspects of the present disclosure alone or in any combination. Again, the brief summary presented above is intended just to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

It is to be understood that the present disclosure provides many different embodiments, or examples, for implementing different features of various embodiments. Specific examples of components and arrangements are described below for purposes of explanation and to simplify the present disclosure. These are, of course, merely examples and are not intended to be limiting.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not mandate any particular orientation of the components.

Some embodiments of the present disclosure generally relate to compensating for changes in a water property during analysis of a multiphase fluid with a multiphase flow meter. In wellsite production monitoring, a multiphase fluid produced from a well can include water having dissolved salt (e.g., brine). The salinity of the water in the multiphase fluid can vary depending on the source of the water and salt. For example, formation water produced from the well may have one salinity, while another water (e.g., sea water injected in a water flood or fresh water circulated in the production system to dissolve precipitated salt) may have another. Mixture of the formation water with another water causes the produced water in the multiphase fluid to have a salinity somewhere between those of the two individual waters. In certain embodiments, measurements made with an RF/microwave sensor are used to adjust water attenuation coefficients used to interpret measurements from a multiphase flow meter to compensate for changes in the salinity of the produced water. In at least some embodiments, this compensation can be performed in real time from RF/microwave sensor measurements acquired during analysis of the multiphase fluid with a multiphase flow meter.

Figure 1:
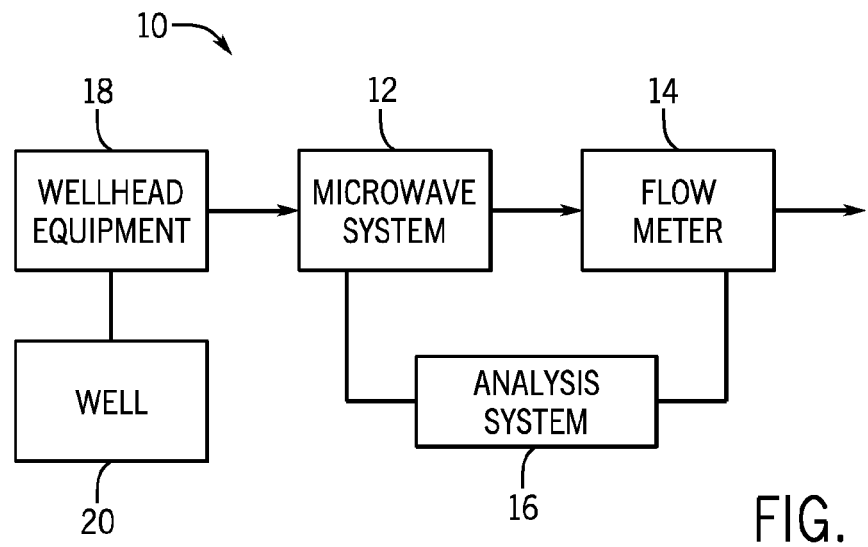
FIG. 1 generally depicts an apparatus including a microwave system, a flow meter, and an analysis system for analyzing fluid produced from a well in accordance with one embodiment of the present disclosure.

Turning now to the drawings, an apparatus 10 is generally shown in FIG. 1 as including a microwave system 12, a flow meter 14, and an analysis system 16 for analyzing received fluid in accordance with one embodiment. In this presently depicted embodiment, the apparatus 10 is positioned at a wellsite and is coupled to wellhead equipment 18 to receive fluid produced from a well 20 for analysis. Flow of this produced fluid from the wellhead equipment 18 is generally represented by the arrows in FIG. 1. But in other embodiments, the apparatus 10 could be used to analyze produced fluids remote from a wellsite, or to analyze other kinds of fluids. Moreover, while certain elements of the apparatus 10 are depicted in this figure and generally discussed below, it will be appreciated that the apparatus 10 may include other components in addition to, or in place of, those presently illustrated and discussed. For instance, the apparatus 10 could include other sensors, such as a pressure sensor, a differential-pressure sensor or a temperature sensor (e.g., resistance temperature detector 82 of FIG. 4).

In at least some embodiments, the apparatus 10 is a multiphase flow meter system in which the flow meter 14 is a multiphase flow meter configured to emit and detect electromagnetic radiation (e.g. in the frequency or energy range of gamma rays or x-rays), the microwave system 12 is configured to emit and detect electromagnetic radiation in the RF/microwave frequency range, and the analysis system 16 is configured to analyze a received fluid using measurements from the microwave system 12 and the flow meter 14. As will be appreciated, a multiphase flow meter can include various components for facilitating analysis of a received multiphase fluid. For example, in one embodiment a multiphase flow meter 14 includes a measurement section having a fluid conduit with an emitter and detector of electromagnetic radiation. In at least some embodiments, the emitter includes a radioactive source that emits nuclear radiation (e.g., gamma rays) and the detector receives nuclear radiation transmitted through fluid within the fluid conduit of the measurement section. In other embodiments, however, the emitter and the detector may use other forms of electromagnetic radiation. To facilitate certain measurements, such as flow rate by the use of a differential-pressure sensor, the fluid conduit can have a tapered bore (e.g., a Venturi throat) to constrict fluid flow. The emitter and the detector can be positioned about a Venturi throat in the fluid conduit such that the detector receives radiation that has been transmitted through received fluid within the Venturi throat.

The microwave system 12 can include any suitable emitter and detector of microwave radiation. One example of such a microwave system 12 includes one emitting antenna and one receiving antenna capable of emitting and detecting microwave radiation and making transmission amplitude-attenuation and phase-shift measurements across pipe section at a Venturi throat, as disclosed in U.S. Pat. No. 7,908,930. One further example of a microwave system 12 includes two emitting antennas and two receiving antennas capable of emitting and detecting microwave radiation across pipe (as disclosed in U.S. Pat. No. 8,536,883), or near the pipe wall region (as disclosed in U.S. Pat. Appl. No. 2013/0327154), and capable of making cross-pipe or near-wall transmission amplitude-attenuation ratio and phase-shift difference measurements. A microwave system 12 may include a single trans-receiving antenna, such as an open-ended coaxial reflection probe capable of emitting and detecting microwave radiation and making reflection coefficient measurement near the probe's open aperture (as disclosed in U.S. Pat. No. 6,831,470).

Figure 2:
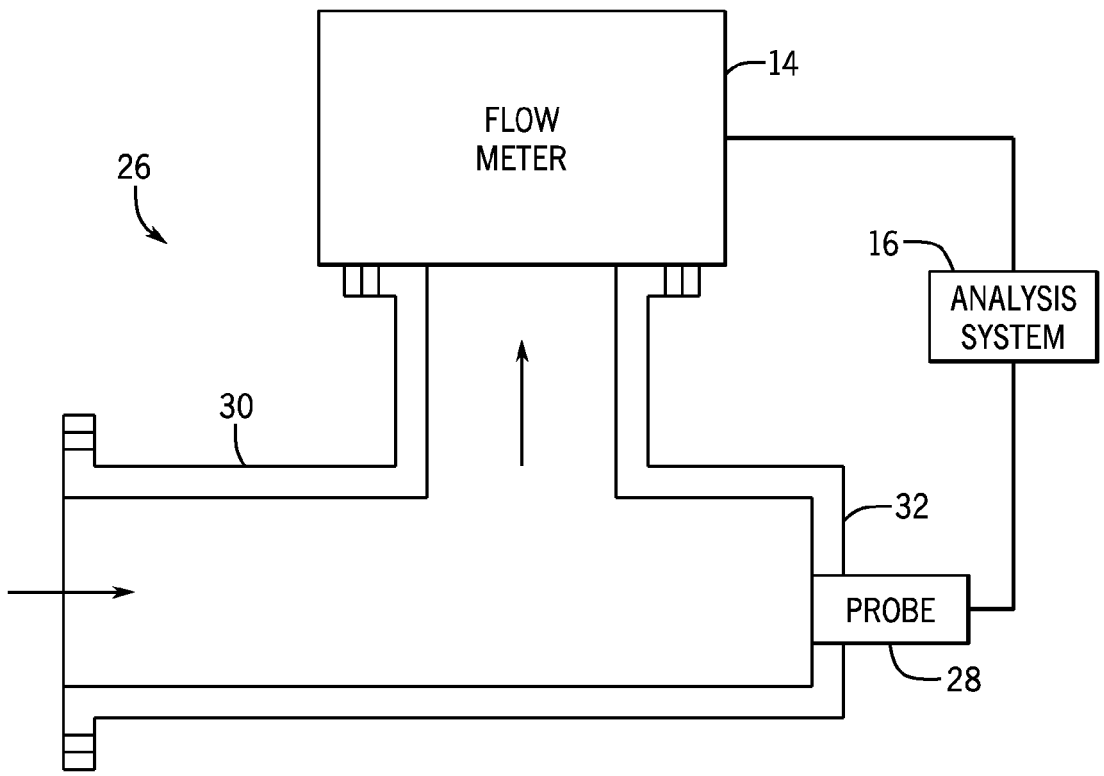
FIG. 2 depicts an inlet conduit coupled to the flow meter of FIG. 1, with the microwave system provided as a microwave reflection probe coupled to the inlet conduit, in accordance with one embodiment.

In one embodiment generally illustrated in FIG. 2, the apparatus 10 is provided in an arrangement 26 that includes the microwave system 12 in the form of such an open-ended coaxial reflection probe 28. The probe 28 is coupled to an end wall 32 of a conduit 30. The conduit 30 can be coupled as an inlet conduit to the flow meter 14. In the presently depicted embodiment, the conduit 30 is a blind tee in which fluid (e.g., fluid produced from well 20) flows into the conduit 30 from one end and then up through another end to the inlet of the flow meter 14, as generally indicated by the arrows in FIG. 2. The probe 28 is shown positioned at the end wall 32 of the blind end of the blind tee. During flow of a multiphase fluid through the conduit 30 in such an embodiment, a water-rich region may form in the blind end of the blind tee next to the probe 28. The probe 28 can be used to irradiate the water-rich region with microwaves and to detect microwaves reflected by the water-rich multiphase fluid. Although the system 12 and the probe 28 are described herein as configured to emit and detect microwave radiation, in other embodiments the system 12 and the probe 28 could be configured to emit a different form of electromagnetic radiation. The system 12 could also take other forms, such as a microwave sensor unit comprising two emitting and two receiving antennas, positioned at the end wall 32 of the blind end of the blind tee (e.g., at the location of the probe 28 in FIG. 2), used to irradiate the water-rich region with microwaves and to detect microwaves transmitted through the water-rich multiphase fluid (as disclosed in U.S. Pat. Appl. No. 2013/0327154). As described in additional detail below, measurements acquired with the probe 28 (or with a microwave transmission sensor unit, or a microwave resonance sensor unit) can be used to compensate for changes in a property of water (e.g., salinity) of a multiphase fluid analyzed with the flow meter 14 and the analysis system 16.

The analysis system 16 can be provided in any suitable form, such as a programmed computer 40 or another processor-based system. An example of such a computer 40

Figure 3:
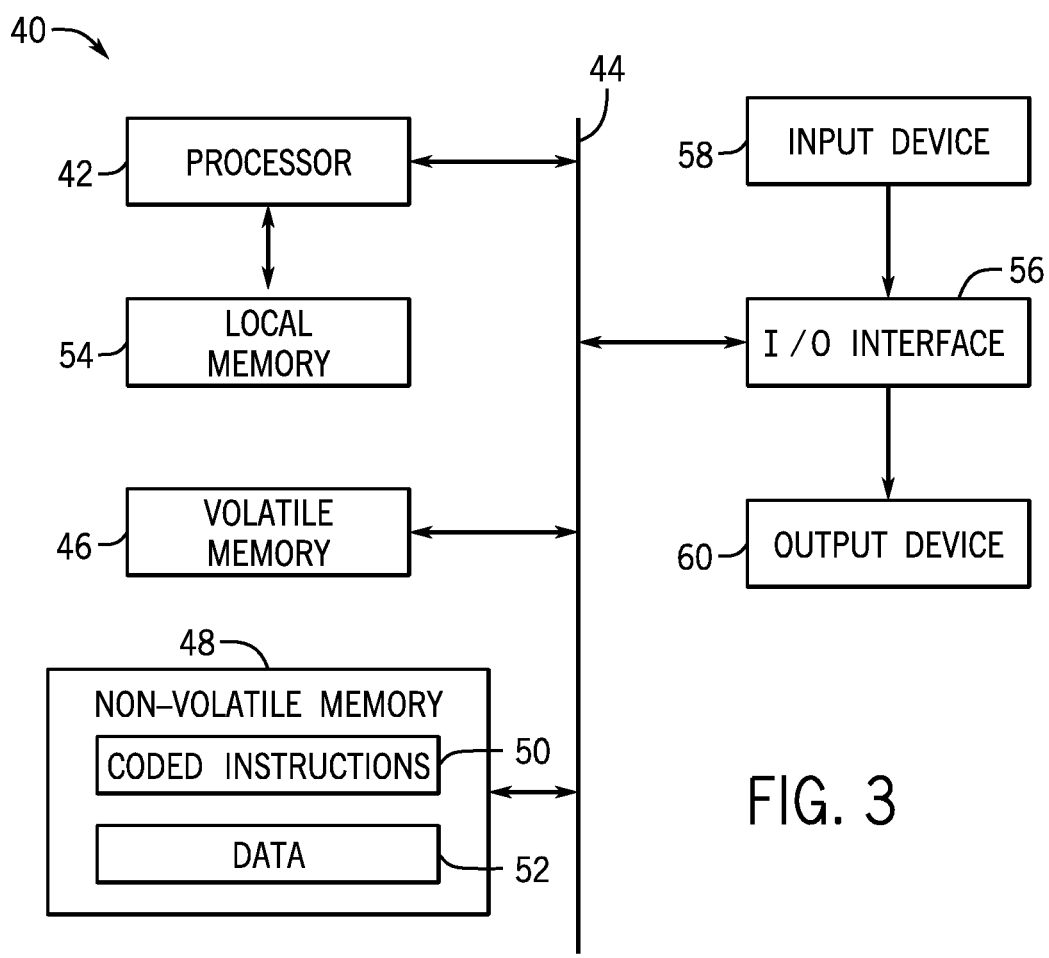
FIG. 3 is a block diagram of components of the analysis system of the apparatus of FIG. 1 in accordance with one embodiment.

(which could also be referred to as a controller or a control unit) is generally depicted in FIG. 3. In at least some embodiments, the computer 40 is provided in the form of a flow computer coupled with the flow meter 14 in a single unit to facilitate installation in a larger system (e.g., an oilfield apparatus). More specifically, the computer 40 is operable to determine characteristics of fluid within the fluid conduit of the flow meter 14 based on measurements collected by the other components (e.g., microwave system 12 and flow meter 14). For example, the computer 40 can determine a flow rate of the fluid within the flow meter 14. Further, a computer 40 of a multiphase flow meter can determine the attenuation of the fluid with respect to various levels of electromagnetic radiation by comparing the amount of radiation emitted from the emitter of the flow meter 14 to the portion of such radiation actually received by the detector of the flow meter 14. Such a computer 40 can also use this information to calculate phase fractions (e.g., proportions of oil, gas, and water) for a multiphase fluid within the fluid conduit of the flow meter measurement section. Individual phase flow rates can be achieved by combining the phase fraction measurements together with the total flow rate determined, for example, from a Venturi different-pressure measurement (and a mixture density derived from the phase fraction measurements).

Although the computer 40 could take other forms, the computer 40 is depicted in FIG. 3 as including at least one processor 42 connected by a bus 44 to volatile memory 46 (e.g., random-access memory) and non-volatile memory 48 (e.g., flash memory and a read-only memory (ROM)). Coded application instructions 50 and data 52 are stored in the non-volatile memory 46. For example, the application instructions 50 can be stored in a ROM and the data 52 can be stored in a flash memory. The instructions 50 and the data 52 may be also be loaded into the volatile memory 46 (or in a local memory 54 of the processor) as desired, such as to reduce latency and increase operating efficiency of the computer 40. The coded application instructions 50 can be provided as software that may be executed by the processor 42 to enable various functionalities described herein, such as determining phase fractions and flow rates for a multiphase fluid flowing through the flow meter 14 and, as described in additional detail below, applying compensation to analysis of the multiphase fluid for changes in the salinity or other characteristic of water of the multiphase fluid. In at least some embodiments, the application instructions 50 are encoded in a non-transitory computer readable storage medium, such as the volatile memory 46, the non-volatile memory 48, the local memory 54, or a portable storage device (e.g., a flash drive or a compact disc).

An interface 56 of the computer 40 enables communication between the processor 42 and various input devices 58 and output devices 60. The interface 56 can include any suitable device that enables such communication, such as a modem or a serial port. In some embodiments, the input devices 58 include one or more sensing components of the apparatus 10 (e.g., radiation detectors of the microwave system 12 and the flow meter 14, a temperature sensor, a pressure sensor, a differential pressure sensor, or a pressure/temperature/differential-pressure multi-variable transmitter) and the output devices 60 include displays, printers, and storage devices that allow output of data received or generated by the computer 40. Input devices 58 and output devices 60 may be provided as part of the computer 40 or may be separately provided.

While the computer 40 could be located with the flow meter 14 and the microwave system 12 as a unitary system, the computer 40 could also be located remote from the other components of the apparatus 10. Further, the computer 40 could be provided as a distributed system with a portion of the computer 40 located with the microwave system 12 or the flow meter 14 and the remaining portion of the computer 40 located remote from the microwave system 12 or the flow meter 14.

Figure 4:
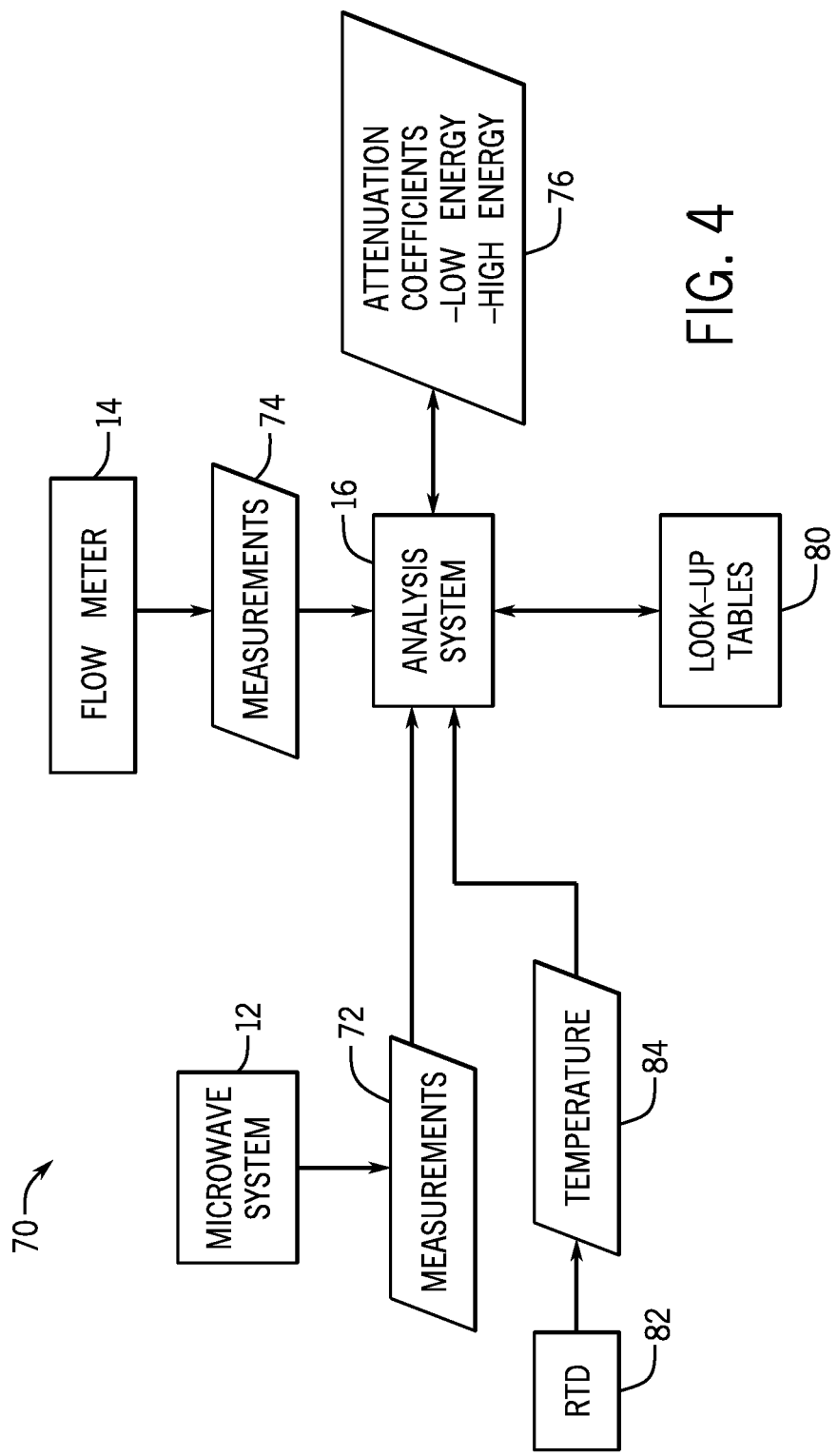
FIG. 4 is a functional diagram generally showing input to the analysis system of FIG. 1 for analyzing fluid in accordance with one embodiment.

As represented by a functional diagram 70 in FIG. 4, the analysis system 16 is operable to determine a characteristic of the multiphase fluid (e.g., phase hold-ups, water-liquid ratio (WLR), and individual phase flow rates) based on measurements 74 (e.g., gamma-ray count-rates data) from the flow meter 14 and attenuation coefficients 76. The attenuation coefficients 76 can be stored in a memory of the analysis system 16. Also, as described in greater detail below, at least one of the attenuation coefficients 76 can be determined by the analysis system 16 based on measurements 72 from the microwave system 12 and one or more look-up tables 80 (or some other database) including correlations between attenuation coefficients and other parameters (e.g., temperature and parameters representative of complex permittivities derived from measurements 72).

As noted above, the flow meter 14 can include an emitter and detector of electromagnetic radiation, which enable measurement of attenuation or scattering data for fluid within the flow meter 14. In some embodiments, fluid within the measurement section of the flow meter 14 is irradiated with electromagnetic radiation from the emitter. Some of the electromagnetic radiation is absorbed or scattered by the fluid, but a portion of the electromagnetic radiation is received by the detector. The emitter can produce electromagnetic radiation of any suitable frequency and energy within the electromagnetic spectrum. For instance, in some embodiments the emitter includes one or more radioactive sources that emit gamma rays and x-rays. Other embodiments could include non-radioactive emitters, such as electric x-ray generators, in full accordance with the present techniques.

The emitter and the detector of the flow meter 14 can be positioned on opposite sides of the fluid conduit and the linear attenuation coefficient, $\lambda_m(E)$, of the fluid for gamma-ray or x-ray electromagnetic radiation at a given energy E can be measured according to the Beer-Lambert law:

$$\lambda_m(E) = \frac{1}{d}\ln(N_0(E)/N(E)),$$

in which d is the diameter of the fluid conduit through which the radiation is directed, N(E) is the amount of transmitted photons (the count rates or the quantity of photons detected by the detector), and $N_0(E)$ is the empty pipe count rates (the quantity of photons emitted from the emitter that would have reached the detector with no fluid in the fluid conduit).

In some instances, the analyzed fluid can have multiple phases. For example, the fluid can be a multiphase fluid having an oily liquid phase, an aqueous liquid phase, and a gaseous phase, which may be more generally referred to as oil, water, and gas phases. It will be appreciated by those skilled in the art that the attenuation of gamma-ray or x-ray electromagnetic radiation by a multiphase fluid is a linear combination of the attenuations caused by each of its phases weighted by their proportions in the fluid. In the case of a fluid having some combination of oil, water, and gas, this can be written as:

$$\lambda_m(E) = \lambda_g(E)\alpha_g + \lambda_w(E)\alpha_w + \lambda_o(E)\alpha_o,$$

where $\lambda_g(E)$, $\lambda_w(E)$, and $\lambda_o(E)$ are attenuation coefficients for gas, water, and oil for radiation of a given energy level E, and $\alpha_g$, $\alpha_w$, and $\alpha_o$ are respective fractional portions of each phase within the analyzed fluid traversed by gamma-ray or x-ray radiation beam (also referred to herein as phase hold-ups or phase fractions). This gives as many equations as the number of distinct energy levels in the electromagnetic radiation from the emitter of the flow meter 14. Further considering that the three phase hold-ups sum up to 1, the following system of linear equations can be achieved:

$$\begin{pmatrix} \lambda_g(E_1) & \lambda_w(E_1) & \lambda_o(E_1) \\ \vdots & \vdots & \vdots \\ \lambda_g(E_n) & \lambda_w(E_n) & \lambda_o(E_n) \\ 1 & 1 & 1 \end{pmatrix} \cdot \begin{pmatrix} \alpha_g \\ \alpha_w \\ \alpha_o \end{pmatrix} = \begin{pmatrix} \lambda_m(E_1) \\ \vdots \\ \lambda_m(E_n) \\ 1 \end{pmatrix}$$

The attenuation matrix above (i.e., the matrix including the phase-specific attenuation coefficients for n energy levels) can be obtained from full bore measurements on each phase, hereafter called the in-situ references, or theoretical coefficients can be used. This attenuation matrix can then be inverted (giving an inversion matrix $A^{-1}$) to calculate the phase hold-ups:

$$\begin{pmatrix} \alpha_g \\ \alpha_w \\ \alpha_o \end{pmatrix} = A^{-1} \cdot \begin{pmatrix} \lambda_m(E_1) \\ \vdots \\ \lambda_m(E_n) \\ 1 \end{pmatrix}$$

In at least some embodiments, the attenuation of gamma-ray or x-ray electromagnetic energy is measured at two different energy levels (n=2), which may be referred to as a high energy level and a low energy level. This gives three linear equations, allowing the phase hold-ups to be calculated from measured attenuations of the analyzed fluid at the two energy levels and the individual phase attenuation coefficients 76 (FIG. 4) for water, gas, and oil at the two energy levels. Although two energy levels are provided as an example, it will be appreciated that a different number of energy levels may be used in other embodiments. The emitter of the flow meter 14 is a radioactive source in at least one embodiment and attenuation of nuclear energy is measured at two different energy levels (e.g., gamma rays or x-rays). In such an instance, the attenuation coefficients for the single phases (e.g., for both high energy and low energy) can be referred to as nuclear mass attenuation coefficients.

In some embodiments, the look-up tables 80 store empirically determined associations between complex permittivities (e.g. calculated from reflection coefficients) measured with the microwave system 12 (e.g., the reflection probe 28) and mass attenuation coefficients for one or more phases of a multiphase fluid. For example, the look-up tables 80 can store empirically determined relationships between water attenuation coefficients (which could be either or both of high energy and low energy attenuation coefficients for water) and the water complex permittivities at different temperatures. As used herein, relationships (or correlations) between attenuation coefficients and complex permittivities may include relationships (or correlations) between the attenuation and complex permittivities themselves or parameters derived from the attenuation coefficients or complex permittivities (e.g., between the attenuation coefficients and parameters derived from the complex permittivities). In operation of the apparatus 10 (e.g., for production monitoring), the analysis system 16 can use an empirical transformation, embodied by a look-up table 80, to determine an attenuation coefficient (e.g., a nuclear mass attenuation coefficient for water) based on a measured complex permittivities (derived from, e.g., reflection coefficients measured by probe 28). In some instances, the look-up tables may store empirically determined associations between complex permittivities, mass attenuation coefficients, and fluid temperatures. The temperature 84 can be measured with any suitable sensor of the apparatus 10, such as a resistance temperature detector (RTD) 82.

Figure 5:
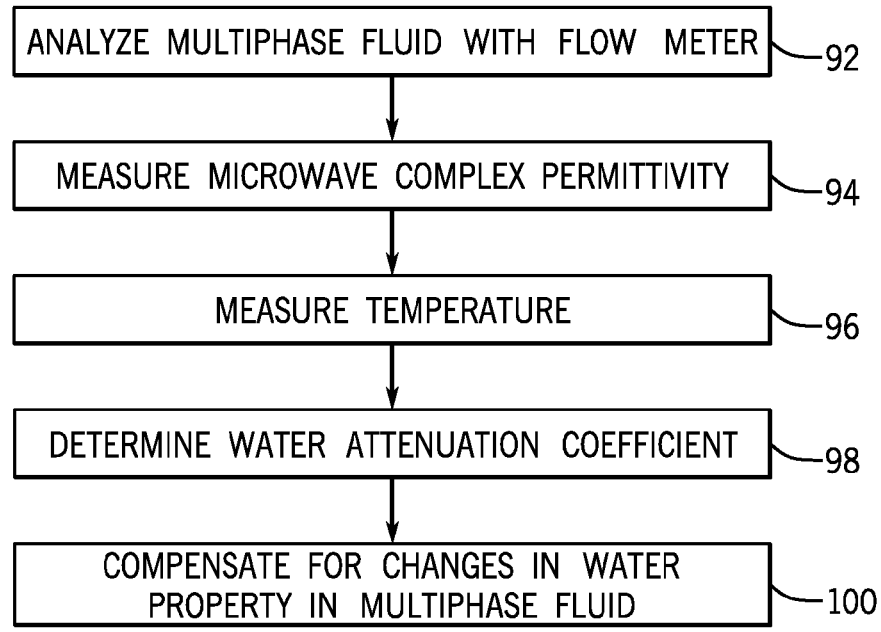
FIG. 5 is a flowchart for compensating for changes in a property of water in a multiphase fluid analyzed with a multiphase flow meter in accordance with one embodiment.

With the foregoing in mind, an example of a process for compensating for changes in a property of water of a multiphase fluid is generally represented by flowchart 90 in FIG. 5. In this embodiment, a multiphase fluid is analyzed with a multiphase flow meter (block 92). A microwave complex permittivity and temperature for the multiphase fluid can be measured (blocks 94 and 96), such as with the microwave system 12 and the RTD 82. In at least one instance, the microwave complex permittivity (e.g., derived from reflection coefficient) is measured for the multiphase fluid in the water-rich region of a blind tee adjacent the microwave system (e.g., reflection probe 28), as described above. The water-rich part of the measured microwave complex permittivity data and temperature can then be used to determine water attenuation coefficients (block 98), which can be used to compensate for changes in a property of the water of the multiphase fluid (block 100).

By way of example, in certain embodiments, the microwave sensor or the microwave system 12 is a microwave reflection probe 28, and the water-rich complex permittivities (derived from the measured microwave reflection coefficients) and temperatures are used to determine a suitable value of the low energy and high energy mass attenuation coefficients using a look-up table 80 to compensate for changes in a property of the water (e.g., salinity) in a multiphase fluid analyzed with the flow meter 14. While both low energy and high energy mass attenuation coefficients can be determined, in other instances either of low energy or high energy mass attenuation coefficients could be determined. The determined values of attenuation coefficients can be read directly from a look-up table 80 or determined through interpolation from the data stored in the look-up table 80. In this manner, during analysis of a multiphase fluid by the apparatus 10, the analysis system 16 can adjust values of attenuation coefficients 76 for water (used to determine characteristics of the multiphase fluid via measurements 74 of the flow meter 14) to compensate for changes in the salinity or some other property of water in the multiphase fluid.

Figure 6:
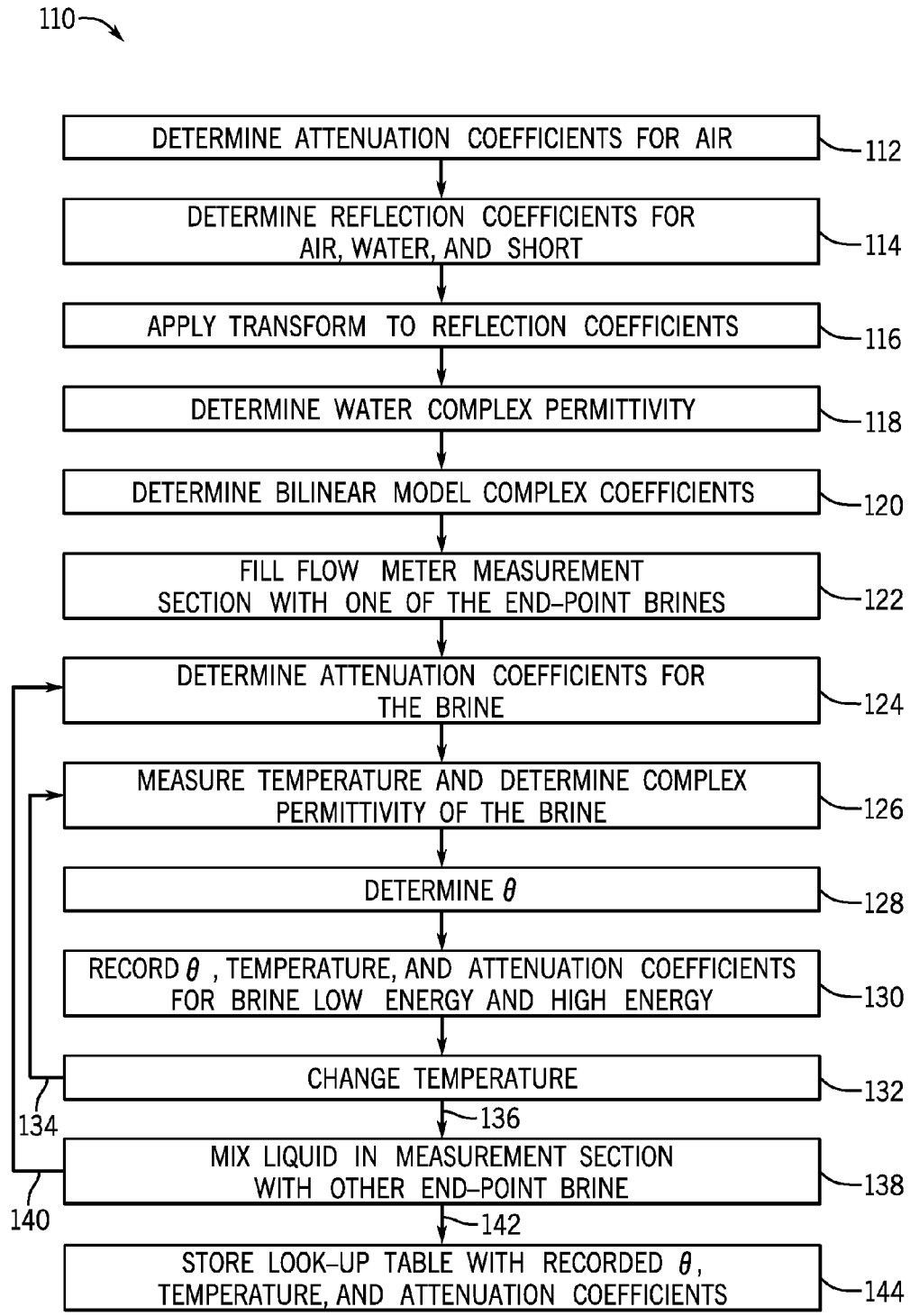
FIG. 6 is a flowchart for using the multiphase flow meter to create a look-up table representing relationships between mass attenuation coefficients, temperatures, and complex-permittivity parameters derived from microwave reflection coefficients in accordance with one embodiment.

One example of a process for creating a look-up table 80 is generally represented by flowchart 110 in FIG. 6. As explained in further detail below, a look-up table can be created by using the apparatus 10 to record a series of measurements with a variety of different waters at various temperatures. In some embodiments, the different waters include two waters expected to be produced from a well (e.g., formation water and injected water) and mixtures of those two waters. The two waters can be brines and are described as end-point brines below, as the salinity (or some other characteristics) of any mixture of the two brines would fall between those of the two brines. But it is noted that either (or both) of the end-point brines could instead be another form of water (e.g., freshwater or saline water). Additionally, while certain details are provided in the following example with respect to implementation of the process with specific hardware (e.g., in the context of a nuclear multiphase flow meter and a microwave open-ended coaxial reflection probe), it will be appreciated that other hardware (such as a microwave transmission sensor unit, or a microwave resonance sensor unit) could be used and that the described process could be modified for use with other hardware.

In the presently illustrated example, the process includes determining an attenuation coefficient for air in a multiphase flow meter (block 112). In at least one embodiment, the multiphase flow meter is a nuclear multiphase flow meter that uses nuclear radiation with two energy levels (high energy and low energy). In such an embodiment, determining the attenuation coefficient for air can include drying and filling the measurement section of the flow meter with air, followed by determining the high energy and low energy attenuation coefficients for air.

The process also includes measuring reflection coefficients (block 114), such as with an open-ended coaxial microwave reflection probe 28. This can include measuring the empty-pipe ($\epsilon_{air}$=1) reflection coefficient for air ($\Gamma_{air}$), as well as shorting the measurement end of the coaxial reflection probe (e.g., with a shorting block) and measuring the reflection coefficient value for the shorted probe ($\Gamma_{short}$). Further, the measurement end of the coaxial reflection probe can be covered with pure water and the reflection coefficient for the pure water ($\Gamma_{water}$) can be measured. The measurement of these three reflection coefficients (for air, short, and water) can represent a three-fluid calibration process that may reduce inconsistencies between different microwave measuring systems (e.g., differences in coaxial probes or other components of the microwave systems). It will be appreciated that the measured reflection coefficients can be determined according to:

$$\Gamma=(U-e)/(d-Uc),$$

where U is a reflected-to-incident channel (complex) voltage ratio measured from the microwave reflection probe 28, and c, d, and e are calibration coefficients for the microwave system electronics (typically derived by using three microwave calibration standards—open, short and matched loads). In one embodiment, these calibration coefficients can be accessed from a look-up table linking calibration coefficients for the microwave electronic system to measured electronics circuit-board temperatures.

A transform can be applied to at least some of the reflection coefficients (block 116). In some embodiments, this is a normalizing transform (which could be a linearizing transform in certain embodiments) applied to the measured reflection coefficients $\Gamma$ to normalize with respect to $\Gamma_{air}$. By way of example, the normalizing transform, G, can be:

$$G=[\Gamma_{air}-\Gamma]/[\Gamma_{air}+\Gamma],$$

For the 3-fluid calibration process, $\Gamma$ is either $\Gamma_{short}$ (for $G_{short}$) or $\Gamma_{water}$ (for $G_{water}$) depending on the reflection coefficient being transformed. The complex permittivity of the pure water, $\epsilon_{water}$, at the prevailing temperature can also be determined (block 118), such as from known published correlations. Complex coefficients of a bilinear model can then be determined (block 120). In one embodiment, the bilinear model is the Cole bilinear model for determining complex permittivity:

$$\epsilon=(AG+\epsilon_{air})/(1-BG),$$

in which the complex coefficients A and B are determined using:

$$A = \frac{\epsilon_{water}-\epsilon_{air}}{G_{water}} - \frac{\epsilon_{water}}{G_{short}}, B = \frac{1}{G_{short}}$$

The measurement section of the multiphase flow meter can then be filled with one of the end-point brines (block 122) and attenuation coefficients (e.g., nuclear low energy and high energy attenuation coefficients) for the brine can be measured (block 124). Although both low energy and high energy attenuation coefficients can be determined, other embodiments may include determining just one of these (e.g., the low energy attenuation coefficient). These measurements of the attenuation coefficients may be informed by the known fluid density of the brine. The temperature of the brine and its complex permittivity can also be determined (block 126). The temperature can be measured with a temperature sensor (e.g., RTD 82). The complex permittivity of the brine can be determined in any suitable fashion, such as from the Cole bilinear model noted above:

$$\epsilon=(AG+\epsilon_{air})/(1-BG),$$

in which G is the transformed reflection coefficient for the brine (derived from the measured reflection coefficient $\Gamma$ for the brine). A parameter, $\theta$, can then be determined for the complex permittivity of the brine (block 128). In one embodiment, $\theta$ is the slope of a line linking the measured value of (Re[$\epsilon$], $\sigma$=−$\omega\epsilon_o$Im[$\epsilon$]) and the empty-pipe endpoint value (1, 0), where $\omega$ is the microwave angular frequency, $\epsilon_o$=8.854 pF/m, Re[$\epsilon$] is the real component of the complex permittivity, and Im[$\epsilon$] is the imaginary component of the complex permittivity. The measured temperature, parameter $\theta$, and attenuation coefficients for the brine can be recorded (block 130), such as in a look-up table or on a graph.

The temperature of the brine in the measurement section can then be changed (block 132) and, as generally indicated by return path 134, the measurement of the temperature, the determination of the parameter $\theta$, and the recording of the measured temperature, parameter $\theta$, and attenuation coefficients for the brine can be recorded for the new temperature (the attenuation coefficients are independent of temperature and should not change). This may be repeated for additional temperatures, as desired, such as to cover a range of fluid temperatures that may occur during production monitoring with a multiphase flow meter. In one embodiment, the temperature is incremented (e.g., in increments of five, ten, or twenty degrees Celsius) within a range of possible fluid temperatures.

After recording attenuation coefficients and parameters $\theta$ for a desired number of temperatures, the process may continue (path 136) with mixing the liquid in the measurement section with some amount (e.g., a small quantity) of the other end-point brine (block 138) to change the brine concentration. The actions of blocks 124, 126, 128, 130, 132, and 138 can then be repeated (return path 140) until desired coverage of the expected brine composition and temperature range has been achieved. Once the desired coverage has been achieved, the process may continue (path 142) with storing the look-up table (block 144) with the recorded correlations (e.g., between brines' microwave complex permittivities and nuclear mass attenuation coefficients) for later use during multiphase fluid analysis by a flow meter. In some embodiments, the created look-up table can be used for multiple wells and flow meters.

In the process represented by flowchart 110, the parameter $\theta$ is determined in the complex permittivity domain. In other embodiments, a different parameter $\theta$ could be determined in some other way, such as in the complex reflection coefficient domain. In one such embodiment, the parameter θ is instead the slope of a line linking a measured value of G (the transformed measured reflection coefficient) to an empty-pipe endpoint value. In that embodiment, the transform G is a linearizing transform and the parameter θ can be determined without using the Cole bilinear model described above.

Figure 7:
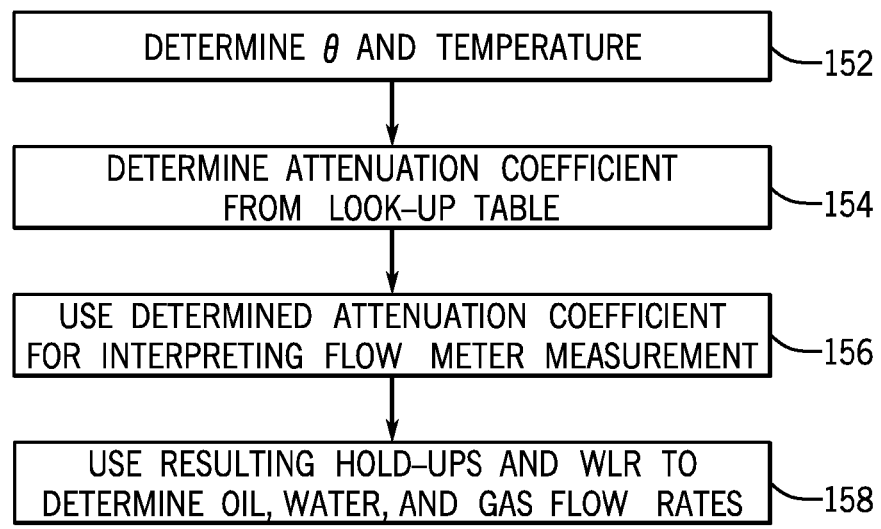
FIG. 7 is a flowchart for using a look-up table, such as that created via the flowchart of FIG. 6, to compensate for changes in a water property during analysis of a multiphase fluid by the multiphase flow meter in accordance with one embodiment.

As noted above, a created look-up table with empirically determined relationships between complex permittivities and attenuation coefficients over a range of brine-water temperatures can be used to compensate for changes in salinity (or another property) of water in a multiphase fluid during analysis of the multiphase fluid. In some embodiments, this compensation can be performed in real time based on measured complex permittivities (e.g., derived from reflection coefficients) and relationships embodied in the look-up table. An example of such a process is generally represented by flowchart 150 in FIG. 7. In this embodiment, the process includes determining (e.g., with the apparatus 10) the parameter θ from the measured complex permittivities and the temperature for a received multiphase fluid (block 152). The values of the parameter θ and the temperature could be averaged over some period of time (e.g., minutes), if desired. The parameter θ for the received fluid can be determined from the slope of a cloud of measured water-rich multiphase fluid complex permittivity values (e.g., {Re[ε], σ=−ωε$_o$Im[ε]} in the case of the look-up table created via the process represented in flowchart 110). A check can be done on Re[ε] and σ=−ωε$_o$Im[ε] to use values that correspond to a water (e.g., brine) mixture. As disclosed in U.S. Pat. No. 6,831,470, the parameter θ of the received water-rich multiphase fluid can be substantially the same as that of the prevailing brine water point (the parameter θ of end-point waters or mixed end-point waters have been used to create the look-up table). Furthermore, the parameter θ of the received water-rich multiphase fluid can be substantially higher and more constant than that of the received oil- or gas-rich multiphase fluid. The identification of the parameter θ of the received water-rich multiphase fluid can be made by, e.g., appropriate threshold filtering. The instantaneous or time-averaged values of the identified parameter θ of the water-rich multiphase fluid can be used as input, together with the measured fluid temperature, to the look-up table.

One or more attenuation coefficients (e.g., low energy and high energy attenuation coefficients for water) can then be determined from the look-up table (block 154) using the determined parameter θ and temperature. Although using both the determined parameter θ and the temperature may increase accuracy, in some instances one of these (e.g., the determined parameter θ) could be used without the other to determine the attenuation coefficients. The attenuation coefficients could be read directly from the look-up table based on the determined parameter θ and the temperature, or could be interpolated from the data in the look-up table.

The determined attenuation coefficients could then be used to interpret measurements from the flow meter (block 156). For example, regarding the attenuation coefficient for water, determining the attenuation coefficient based on the determined parameter θ and the temperature allows the attenuation coefficient to be adjusted in response to, and to compensate for, changes in the salinity of the water. Measurements acquired for the multiphase fluid using the determined attenuation coefficient (e.g., phase hold-ups and WLR) can then be used to decompose the total mass flow rate into individual flow rates for the oil, water, and gas phases (block 158). Although not shown in FIG. 7, it is noted that a three-fluid calibration process, such as that described above with respect to FIG. 6, can be performed for a microwave system 12 in an apparatus 10 before performing the process represented in flowchart 150. By using three-fluid calibration process, the look-up table mapping process takes place in complex permittivity domain; the mapped look-up table database built around this domain is much more interpretable, interchangeable and traceable for different microwave systems.

As noted above, a created look-up table with empirically determined relationships between complex permittivities and attenuation coefficients over a range of brine-water temperatures can be used to compensate for changes in salinity (or another property) of water in a multiphase fluid during analysis of the multiphase fluid by a multiphase flow meter. Brine-water complex permittivities measured by other microwave systems (other than the described microwave reflection sensor), such as by a microwave transmission sensor unit, or by a microwave resonance sensor unit, may also be used to create and extend the look-up table. Such an extendable look-up table may store properties (relating temperatures, microwave complex permittivities and mass-attenuation coefficients) of brines of varying mixing proportions of two or more different waters of different salt species, hence making the stored look-up table database more widely applicable to different producing wells or fields.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The invention claimed is:

1. A method comprising:
providing a multiphase flow meter system configured to emit and detect nuclear radiation, to emit and detect microwave radiation, and to analyze a received multiphase fluid;
measuring a temperature of the multiphase fluid;
measuring a microwave complex permittivity of the multiphase fluid; and
compensating, during analysis of the multiphase fluid by the multiphase flow meter system, for changes in a property of water in the multiphase fluid using an empirical transformation between the temperature, the microwave complex permittivity and a nuclear mass attenuation coefficient for water received by the multiphase flow meter system.

2. The method of claim 1, wherein compensating for changes in the property of water in the multiphase fluid includes compensating for changes in the salinity of water in the multiphase fluid.

3. The method of claim 1, wherein compensating for changes in the property of water in the multiphase fluid using the empirical transformation includes compensating for changes in the property of water in the multiphase fluid using a look-up table with empirically determined associations between temperatures, microwave complex permittivities, and nuclear mass attenuation coefficients for water.

4. The method of claim 3, wherein the empirically determined associations between temperatures, microwave complex permittivities, and nuclear mass attenuation coefficients of the look-up table include relationships between temperatures, transformed microwave reflection coefficients and nuclear mass attenuation coefficients for water.

5. The method of claim 4, wherein the transformed microwave reflection coefficients are determined by applying a normalizing transformation to measured microwave reflection coefficients for water or multiphase fluid.

6. The method of claim 5, wherein applying the normalizing transformation to the measured microwave reflection coefficients for water or multiphase fluid includes, for each of the measured microwave reflection coefficients for water or multiphase fluid, subtracting the measured microwave reflection coefficient for water or multiphase fluid from a microwave reflection coefficient for air and dividing the resulting amount by the sum of the microwave reflection coefficients for water or multiphase fluid and air.

7. The method of claim 5, wherein applying the normalizing transformation includes applying a linear transformation to the measured microwave reflection coefficients for water or multiphase fluid.

8. The method of claim 3, wherein the empirically determined associations between temperatures, microwave complex permittivities and nuclear mass attenuation coefficients of the look-up table include relationships between the nuclear mass attenuation coefficients for water and a parameter determined from real and scaled imaginary components of complex permittivity for water modeled from the transformed microwave reflection coefficients.

9. The method of claim 1, wherein compensating for changes in the property of water in the multiphase fluid using the empirical transformation includes compensating for changes in the property of water in the multiphase fluid using a look-up table with empirically determined associations between temperatures, microwave complex permittivities for waters measured from microwave transmission sensor amplitude-attenuation ratios and phase-shift differences, and nuclear mass attenuation coefficients.

10. The method of claim 9, comprising:
measuring a temperature of the multiphase fluid; and
accessing the look-up table to determine a nuclear mass attenuation coefficient based on the measured temperature and the measured microwave complex permittivity derived from transmission amplitude-attenuation ratio and phase-shift difference.

11. An apparatus comprising:
a multiphase flow meter configured to receive a multiphase fluid;
a conduit coupled to the multiphase flow meter;
a microwave sensor coupled to the conduit; and
an analysis system operable to determine a characteristic of the multiphase fluid and to compensate for changes in a property of water in the multiphase fluid by determining values for nuclear mass attenuation coefficients for water used to determine the characteristic based on complex permittivities measured with the microwave sensor and stored data representing empirical correlations between temperatures, microwave sensor measurements and nuclear attenuation coefficients.

12. The apparatus of claim 11, comprising a temperature sensor, wherein the analysis system is operable to compensate for changes in the property of water in the multiphase fluid by determining values for nuclear mass attenuation coefficients for water used to determine the characteristic based on complex permittivities measured with the microwave sensor, temperatures of the multiphase fluid measured with the temperature sensor, and stored data representing empirical correlations between microwave sensor measurements, fluid temperatures, and nuclear attenuation coefficients.

13. The apparatus of claim 11, wherein the microwave sensor includes a microwave reflection probe, a microwave transmission sensor unit, or a microwave resonance sensor unit.

14. The apparatus of claim 11, wherein the multiphase flow meter is positioned at a wellsite and is coupled to receive produced fluid from wellhead equipment.

15. A method comprising:
providing, at different times, a plurality of waters having different salinities in a measurement section of a multiphase flow meter;
determining a microwave complex permittivity and a nuclear mass attenuation coefficient for each of the plurality of waters; and
storing correlations between the determined microwave complex permittivities and the determined nuclear mass attenuation coefficients in a memory to facilitate use of the stored correlations between the determined microwave complex permittivities and the determined nuclear mass attenuation coefficients to compensate in real time for changes in salinity of water in a multiphase fluid during analysis of the multiphase fluid.

16. The method of claim 15, wherein determining the microwave complex permittivity and the nuclear mass attenuation coefficient for each of the plurality of waters includes determining a microwave complex permittivity and a nuclear mass attenuation coefficient for each of the plurality of waters at each of a plurality of temperatures.

17. The method of claim 16, comprising:
storing correlations between the plurality of temperatures, the determined microwave complex permittivities, and the determined nuclear mass attenuation coefficients; and
using the stored correlations between the plurality of temperatures, the determined microwave complex permittivities, and the determined nuclear mass attenuation coefficients to compensate in real time for changes in salinity of the water in the multiphase fluid during analysis of the multiphase fluid.

18. The method of claim 16, comprising storing correlations between the plurality of temperatures, the determined microwave complex permittivities, and the determined nuclear mass attenuation coefficients in a look-up table, the look-up table including stored properties of brines of various mixing proportions of two or more different waters of different salt species to facilitate use of the look-up table with different producing wells or fields.

19. The method of claim 15, wherein each of the plurality of waters provided in the measurement section of the multiphase flow meter is a first water alone, a second water alone, or a mixture of the first and second waters.

20. The method of claim 15, comprising using the stored correlations between the determined microwave complex permittivities and the determined nuclear mass attenuation coefficients to compensate in real time for changes in salinity of water in the multiphase fluid during analysis of the multiphase fluid.

* * * * *